United States Patent
Ohkuma (10) Patent No.: US 6,231,241 B1
(45) Date of Patent: May 15, 2001

(54) ROTATION SUPPORT APPARATUS WITH ROTATIONAL SPEED SENSING DEVICE

(75) Inventor: Takeo Ohkuma, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/421,269

(22) Filed: Oct. 20, 1999

(30) Foreign Application Priority Data

Oct. 21, 1998 (JP) .................................................. 10-299499
Jun. 17, 1999 (JP) .................................................. 11-170760

(51) Int. Cl.[7] ................................................... F16C 32/00
(52) U.S. Cl. ............................................ 384/448; 324/173
(58) Field of Search ........................... 384/448; 324/173, 324/174, 207.2, 207.25

(56) References Cited

U.S. PATENT DOCUMENTS

| | | | |
|---|---|---|---|
| 4,259,637 | * | 3/1981 | Bloomfield et al. . |
| 4,946,295 | * | 8/1990 | Hajzler .................................. 384/448 |
| 5,080,500 | * | 1/1992 | Hilby et al. ........................... 384/448 |
| 5,421,654 | * | 6/1995 | Rigaux et al. ........................ 384/448 |
| 5,567,059 | * | 10/1996 | Morita et al. ......................... 384/448 |
| 5,622,437 | * | 4/1997 | Alff . |
| 5,762,425 | * | 6/1998 | Ouchi .................................. 384/448 |
| 5,893,648 | * | 4/1999 | Smith ................................... 384/448 |
| 6,094,046 | * | 7/2000 | Message et al. ..................... 324/173 |
| 6,127,819 | * | 10/2000 | Ouchi ................................... 324/173 |

FOREIGN PATENT DOCUMENTS

| | | | |
|---|---|---|---|
| 2 301 014 | * | 2/1975 | (FR) . |
| 3-279061 | * | 12/1991 | (JP) . |
| 4-25613 | * | 1/1992 | (JP) . |
| 6-81833 | * | 3/1994 | (JP) . |
| 6-62305 | * | 9/1994 | (JP) . |
| 7-197938 | * | 8/1995 | (JP) . |
| 7-311212 | * | 11/1995 | (JP) . |
| 8-26084 | * | 1/1996 | (JP) . |
| 8-29440 | * | 2/1996 | (JP) . |
| 8-7144 | * | 3/1996 | (JP) . |
| 8-189526 | * | 7/1996 | (JP) . |
| 9-297151 | * | 11/1997 | (JP) . |
| 10-48230 | * | 2/1998 | (JP) . |
| 10-132603 | * | 5/1998 | (JP) . |

* cited by examiner

Primary Examiner—David A. Bucci
Assistant Examiner—Colby Hansen
(74) Attorney, Agent, or Firm—Evenson, McKeown, Edwards & Lenahan, P.L.L.C.

(57) ABSTRACT

An outer ring 4 fitted into a stationary housing 1 is clamped for axial positioning between a stop ring 12 and the stepped face 10 of the step portion 9 on the inner peripheral surface of the housing 1. A sensor 20 is carried in a sensor carrier 19 having a cover 21, such that the cover 21 is fitted into the step portion 9 on the inner peripheral surface thereof by way of interference fit, and that the cover 21 has an abutting portion 23 against the stepped face 10.

2 Claims, 4 Drawing Sheets

ROTATION SUPPORT APPARATUS WITH ROTATIONAL SPEED SENSING DEVICE

FIELD OF THE INVENTION

The present invention relates to a rotation support apparatus with a rotational speed sensing device which is utilized for rotatably supporting a rotating portion constituting various mechanical devices relative to a fixed portion.

BACKGROUND OF THE INVENTION

A rotation support apparatus fitted with a rotational speed sensing device is used, for example, for rotatably supporting wheels of automobiles relative to a suspension system, or supporting a rotation shaft constituting an automotive transmission in a housing, as well as for detecting a rotational speed of the rotating portion.

For example, in the case of the automotive transmission, it is necessary to detect the rotational speed of a rotation shaft to determine the gear shift timing. Moreover, in the case of an automobile, it is required to detect the rotational speed of wheels to properly control an anti-lock brake system (ABS) or a traction control system (TCS).

Therefore, there has heretofore been widely used, a rolling bearing unit fitted with a rotational speed sensing device for rotatably supporting a rotating portion such as a rotation shaft and wheels which constitute various mechanical devices, relative to a fixed portion such as a housing or a suspension system which does not rotate at the time of use, as well as for detecting the rotational speed of the rotating portion.

As a rolling bearing unit fitted with a rotational speed sensing device which can be used for such an application, there is known the device as disclosed in Japanese Laid Open Patent Publication No. TokuKaiHei 7-311212. The rolling bearing unit fitted with a rotational speed sensing device described in this publication rotatably supports an inner ring that is a rotating ring on the inner diameter side of an outer ring that is a stationary ring, via a plurality of rolling members specifically balls.

Moreover, an encoder is supported on an outer peripheral surface on an end portion of the inner ring, and a sensor carrier holding a sensor is supported on an end portion of the outer ring.

In this state, a detecting section of the sensor is made to face a portion to be detected of the encoder across a small gap spanning in the axial direction. The sensor carrier is securely supported on the outer ring in the state that positioning thereof in the axial direction is performed by internally fitting and securing a cylindrical portion disposed at the base end thereof on an end portion of the outer ring, and abutting a part of the sensor carrier against the end face of the outer ring.

At the time of using the rolling bearing unit fitted with a rotational speed sensing device, for example, the outer ring is internally fitted and secured to a stationary member such as a housing or the like, and the inner ring is externally fitted and secured to a rotating portion such as a rotation shaft or the like.

When the inner ring rotates in this state, the output from the sensor whose detecting section is facing the portion to be detected of the encoder via the small gap, changes. The frequency at which the output from the sensor changes is proportional to the rotational speed of the inner ring. Hence, if a signal representing the output is sent to a control device via a harness which is guided out from the sensor, the rotational speed of the rotating portion can be obtained.

If the rolling bearing unit in which the outer ring that is a stationary ring is pressed into and internally fitted inside the housing that is a stationary member is used, there may be cases where the friction force acting on a fitting face between the housing and the outer ring is insufficient, or where a small gap occurs in a part of the fitting face between the housing and the outer ring, due to a change in interference dimensions in the fitting portion, because of a temperature difference between the housing and the outer ring, or an elastic deformation on the fitting face. As a result, there is the possibility that so-called creep occurs where the outer ring rotates relative to the housing at the time of use. If such creep occurs in a standard rolling bearing (having no rotational speed sensing device), there is no major problem.

When a sensor is supported on the outer ring however as with the rolling bearing unit fitted with a rotational speed sensing device, the sensor can rotate relative to the housing, together with the outer ring, As a result, there is the possibility of the harness for taking out the output signal from the sensor being strongly pulled or wound up on peripheral members and severed so that the rotational speed cannot be detected. Moreover, even if the harness is not severed, but rotation of the sensor occurs, accurate detection of the rotational speed cannot be performed.

In U.S. Pat. No. 5,622,437, there is disclosed a rolling bearing unit for supporting wheels in which a part of a sensor carrier supporting a sensor is located by being clamped between an outer ring that is a stationary ring, and a part of a knuckle that is a stationary member in which the outer ring is internally fitted and secured, so that the sensor is located in position. Even in the case of such a rolling bearing unit for supporting wheels however, when rotation of the outer ring occurs inside of the knuckle, there is the possibility of the sensor carrier supporting the sensor rotating together with the outer ring, due to its being clamped by means of a friction force between the end face of the outer ring and the sensor carrier. Hence, as in the above described case, there is also the possibility of the harness being severed, or the accurate detection of the rotational speed cannot be performed.

To solve the above described problems therefore, the occurrence of the above described creep has heretofore been prevented by spanning a pin between the outer ring that is the stationary ring and a housing or the like that is a stationary member, or connecting the outer ring and the housing by a key.

However, providing a portion or member separately for preventing creep gives rise to an increase in cost, which is not desirable. It is therefore desired to realize a structure which can solve the above problems, without increasing the cost.

On the other hand, in the case of the above described conventional structure, since a harness is attached to the sensor, the operation of fitting the rolling bearing unit inside of the machinery must be performed with care so that the harness is not caught in a fitting portion between the outer ring and the housing, or in a fitting portion between the inner ring and the rotation shaft. Particularly, when the sensor and the harness are integrally connected in advance, in the case where the harness attached to the sensor is long, extra care must be taken since the harness can be easily caught in the above described fitting portions. Therefore, the operation of fitting the rolling bearing unit becomes more difficult due to this extra care requirement.

When the rolling bearing unit is fitted inside of the machinery, if the operation of fitting the rolling bearing unit with the encoder inside of the machinery, and of fitting the sensor carrier with the sensor inside of the housing can be carried out separately, then the fitting operation for the rolling bearing unit can be facilitated.

For example, in the case of a construction where the sensor and harness as separate bodies are connected in a subsequent stage, i.e. if an operation for internally fitting and securing the sensor carrier to the housing, and an operation for connecting the harness to the sensor supported on the sensor carrier are carried out before incorporating the rolling bearing inside of the machinery, since the work space inside the housing is relatively secure, the fitting operation of these members can be facilitated. Moreover, subsequently at the time of fitting the rolling bearing inside of the machinery, the operation for ensuring that the harness is not caught in the above described respective fitting portions can be facilitated.

In the case of the above described conventional construction however, since the constriction is such that the rolling bearing and the sensor carrier have to be fitted at the same time, the fitting operation cannot be facilitated as described above.

SUMMARY OF THE INVENTION

An objective of the present invention is to provide a rotation support apparatus with a rotational speed sensing device which is devised taking the above situation into consideration.

Another objective of the present invention is to provide a rotation support apparatus with a rotational speed sensing device in which the rolling bearing and the sensor carrier can be fitted at the same time in the machinery without causing any problem of the harness which otherwise might be caught in the fitting portions.

Another objective of the present invention is to provide a rotation support apparatus with a rotational speed sensing device in which even if creep occurs in the stationary ring with long term use, the sensor held in the stationary ring is kept from rotating together with the stationary ring.

DETAILED DESCRIPTION OF THE PREFERRED EMBODIMENTS

The rotation support apparatus fitted with a rotational speed sensing device according to one feature of the present invention comprises a stationary ring having a stationary side peripheral surface formed with a stationary side raceway and fitted to and supported by the peripheral surface of a stationary member which is not rotatable even during use, a rotating ring having a rotating side peripheral surface opposed to the stationary side peripheral surface and formed with a rotating side raceway and fitted to and supported by a member which is rotatable during use, a plurality of rolling members rotatably provided between the rotating side raceway and the stationary side raceway, an encoder supported by and fixed to part of the rotating ring to be concentric with the rotating ring, and having a portion to be detected, the portion having circumferential characteristics alternately changing with a uniform pitch, and a sensor being not rotatable even during use and having a detecting portion opposed to the portion to be detected of the encoder.

In addition, one axial end face of the stationary ring is abutted directly or via another member to the stepped face located at one axial end of the step portion provided such that it projects in a diametrical direction from the peripheral surface of the stationary member, so that the stationary ring is axially positioned.

Particularly, the sensor is desirably held by a sensor carrier, which is fitted to and fixed by the peripheral surface of the stepped portion and positioned in place in the axial direction with reference to the stepped face. In addition, a portion of the sensor carrier is desirably abutted to the stepped face to position the sensor carrier in place in the axial direction with reference to the stepped face.

In the case of the rotation support apparatus fitted with a rotational speed sensing device constructed as described above, the sensor carrier supporting the sensor is internally fitted and secured to the peripheral surface of the step portion formed on the peripheral surface of the stationary member. In other words, in the case of the present invention, the sensor carrier is not securely supported on the stationary ring. Therefore, even if creep occurs in the stationary ring with long term use of the rolling bearing so that the stationary ring rotates relative to the stationary member, the sensor carrier supporting the sensor is kept from rotating together with the stationary ring.

Hence, problems such as where the sensor rotates or the harness guided out from the sensor is severed can be prevented. Moreover, the sensor carrier is positioned in the axial direction with a stepped face of the step portion designated as a reference face. Therefore detection of the rotational speed to be measured can be accurately performed.

Particularly, if the sensor carrier is positioned in the axial direction by abutting a part of the sensor carrier against the stepped face, positioning of the sensor carrier in the axial direction can be easily performed.

Moreover, the rolling bearing for supporting the encoder can be separately handled from the sensor carrier for supporting the sensor, thereby facilitating the fitting operation of these respective members.

For example, if an operation for internally fitting and securing the sensor carrier to the step portion, and an operation for connecting the harness to the sensor supported on the sensor carrier are carried out before incorporating the rolling bearing unit inside of the machinery, since the work space in the machinery is relatively secure, the fitting operation of the sensor carrier and the harness can be facilitated.

Moreover, subsequently at the time of fitting the rolling bearing unit inside of the machinery, the operation for ensuring that the harness is not caught in the fitting portions between the stationary ring and the rotating ring constituting the rolling bearing and the respective opposing members, can be facilitated.

Incidentally, depending upon the construction of the machinery, in the case where if the harness protrudes, the subsequent fitting operation of tile rolling bearing inside of the machinery becomes difficult due to the protruding harness, the rolling bearing may be incorporated first, and the sensor carrier and the harness then fitted.

The step portion serves as the portion for fitting and supporting the sensor carrier. The step portion is an existing portion for positioning the stationary ring in the axial direction. Hence, in the case of the present invention, an additional portion is not required for fitting and supporting the sensor carrier.

Now the present invention is detailed with reference to the attached drawings.

Figure 1:
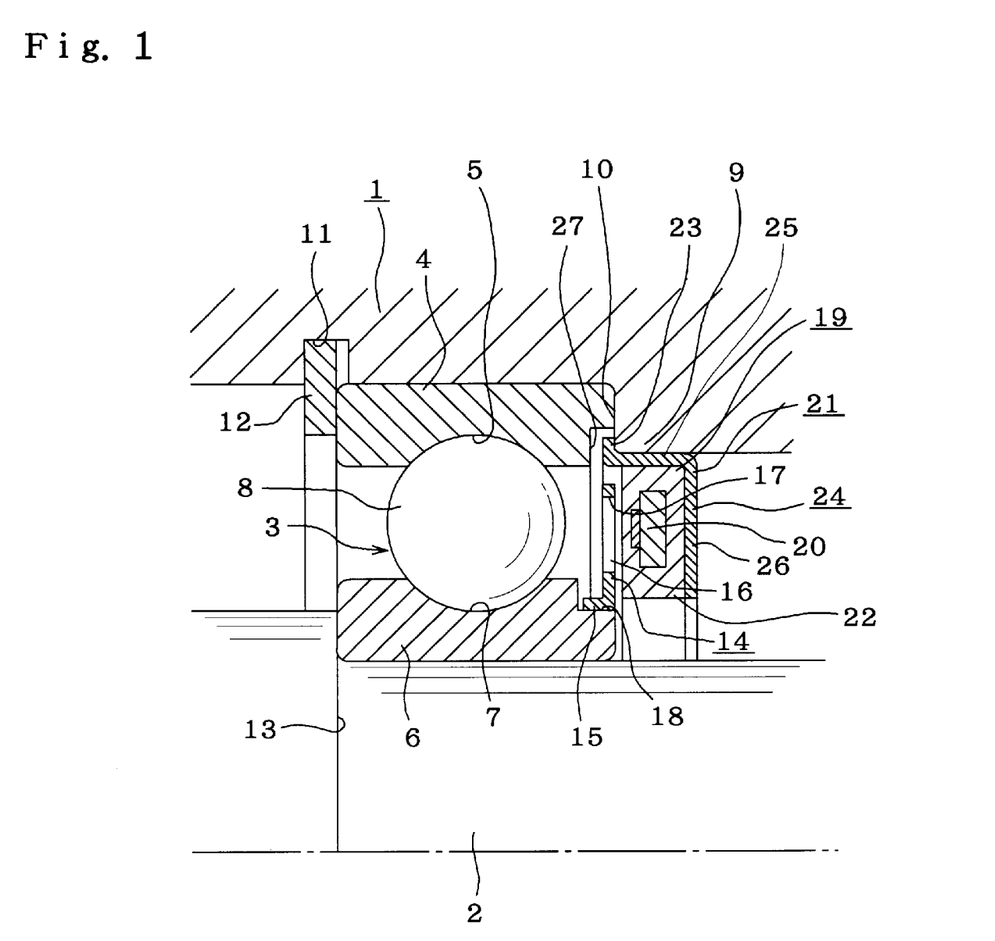
FIG. 1 is a cross sectional view of a half portion of a first example of the embodiments of the rotation support apparatus according to the present invention.

FIG. 1 Shows a first example of an embodiment of the present invention.

A rotation support apparatus is fitted with a rotational speed sensing device, and comprises a housing 1 that is a stationary member which does not rotate even at the time of use, a shaft 2 that is a rotating member which rotates at the time of use, and a rolling bearing 3 by which the shaft 2 is rotatably supported on the inner diameter side of the housing 1.

The rolling bearing 3 comprises an outer ring 4 that is a stationary ring and internally fitted to the housing 1 and an inner ring 6 that is a rotating ring externally fitted to the rotation shaft 2. An outer ring raceway 5 is formed on an inner peripheral face of the outer ring 4 and likewise, an inner ring raceway 7 is formed on an outer peripheral face of the inner ring 6. Moreover, by providing a plurality of rolling members, specifically balls 8, so as to be freely rotatable between the outer ring raceway 5 and the inner ring raceway 7, the rotation shaft 2 is rotatably supported on the inner diameter side of the housing 1.

Moreover, on a part of the inner peripheral surface of the housing 1 in the axial direction, a step portion 9 protruding in the diametrical direction from the inner peripheral surface is formed, and one end face of the outer ring 4 (the right end face in FIG. 1) is abutted against a stepped face 10 which exists at the end portion in the axial direction of the step portion 9.

Furthermore, an engagement groove 11 is formed on the inner peripheral face of the housing 1, and a stop ring 12 in the form of a semicircular ring or snap ring, is engaged in the engagement groove 11, so that the other end face of the outer ring 4 (the left end face in FIG. 1) is held by means of the stop ring 12. In this way, the outer ring 4 is positioned in place in the axial direction.

Here, in the case of this example, the outer ring 4 having only minor dimensional errors is directly clamped between the stepped face 10 and the stop ring 12. In other words, the outer ring 4 is not clamped together with members such as a sensor carrier 19 described later or the like having a large dimensional error. Hence, when the outer ring 4 is assembled in the housing 1, a large gap spanning in the axial direction can be prevented from occurring between the opposite ends in the axial direction of the outer ring 4 and the stepped face 10 and the side face of the stop ring 12, which face these opposite ends, so that the outer ring 4 does not chatter significantly in the axial direction.

On the other hand, the inner ring 6 is externally fitted and secured by interference fit on the outer peripheral surface of the rotation shaft 2. Furthermore, on the outer peripheral surface of one end portion of the inner ring 6 (the right end portion in FIG. 1), an encoder 14 is externally fitted and secured by interference fit. Moreover, the end face of the inner ring 6 on the other end portion (the left end portion in FIG. 1) is abutted against the stepped face 13 formed on the outer peripheral surface of the rotation shaft 2, to thereby enable positioning of the inner ring 6 in the axial direction.

The encoder 14 is made from e.g. a magnetic metal plate such as low carbon steel plate and formed in an overall annular shape to give an L-shape in cross-section, specifically comprised of a cylindrical portion 15 and a circular ring portion 16 bent in the diametrically outward direction from one end rim (the right end rim in FIG. 1) of the cylindrical portion 15.

On this ring portion 16, there are formed a number of through holes 17 in the circumferential direction at even intervals with each other, each of which extends radially in a slit form, so that the magnetic property of the ring portion 16 changes alternately in the circumferential direction at even intervals. In addition, in the example shown in the drawing, a small-diameter step portion 18 is provided on the outer peripheral face of the one end portion of the inner ring 6, and the cylindrical portion 15 is externally fitted and secured to the small-diameter step portion 18.

The ring portion 16 of the encoder 14 serves as the portion to be detected, which is referred to as the detected portion in the present specification.

A sensor carrier 19 is provided within the housing 1 and consists of a cover 21 made of a magnetic metal plate, such as a low carbon steel plate like Japanese Industrial Standards SPCC, and a retaining ring 22 made of a synthetic resin held inside the cover 21.

The cover 21 is formed in an overall annular shape to give a crank shape in cross-section, specifically a circular ring shaped abutting portion 23 is formed on an outer diameter side thereof and a retaining portion 24 is formed in an L-shape in cross-section on the inner peripheral rim portion of the abutting portion 23.

A cylindrical portion 25 constituting the outer diameter portion of the retaining portion 24 is then internally fitted and secured by interference fit to tile inner peripheral face of the step portion 9. The abutting portion 23 is abutted against a portion towards the inner periphery of the stepped face 10 of the step portion 9 to enable positioning of the cover 21 in the axial direction.

In the case of this example, on the inner peripheral rim portion on one end face of the outer ring 4, there is formed a step portion 27 bored in the axial direction from the one end face around the whole periphery, so that the portion towards the inner periphery of the one end face of the outer ring 4 does not abut against the abutting portion 23 abutted against the portion towards the inner periphery of the stepped face 10.

The retaining portion 24 is constructed so that a part of the retaining portion 24 in the circumferential direction is protruded axially (to the right in FIG. 1) to serve as a holding portion 26. In the retaining portion 24 including the holding portion 26, the retaining ring 22 made of the synthetic resin is securely held.

Of the retaining ring 22, in a portion located in the holding portion 26, there is supported in an encapsulated condition an active type sensor 20 comprising an IC incorporating a magnetic sensor including a magnetic detection element with a property which changes according to the quantity of magnetic flux, such as a Hall element, a magneto-resistive reluctance element or the like, and a wave-shaping circuit for shaping the output waveform from the magnetic sensor, and a permanent magnet magnetized in the axial direction (in the lateral direction in FIG. 1).

The encoder 14 and the sensor 20 constitute a rotational speed sensing device.

In executing the present invention, however, the structures of the sensor 20 and the encoder 14 are not particularly limited. Other magnetic detection types such as passive type and other structures such as photoelectric type, eddy current type or the like can be adopted.

The detecting section of the sensor 20 faces the circular ring portion 16 serving as the detected portion of the encoder 14 via the small gap spanning in the axial direction, in a state that the sensor carrier 19 for supporting such a sensor 20 is securely supported on the step portion 9 provided on the inner peripheral surface of the housing 1. Here, in the case of this example, as described above, significant chatter in the axial direction of the outer ring 4 is prevented.

Hence, the housing 1 and the rotation shaft 2 are prevented from being displaced significantly in the axial direction, so that the circular ring portion 16 of the encoder 14 securely supported on the inner ring 6 of the rolling bearing 3, can be prevented from being displaced in the axial direction relative to the detecting section of the sensor 20. Or, the relative displacement amount can be suppressed to a minimum whereby the accuracy of the rotational speed detection described below is enhanced.

Moreover, a harness, not shown, for taking out the detection signal of the sensor 20 is guided out in the circumferential direction from a guiding portion, not shown, provided in a position off from the holding portion 26 in the circumferential direction, in a part of the retaining portion 24. In the case of this example, the sensor carrier 19 for supporting the sensor 20 is internally fitted and secured to the step portion 9, before the outer ring 4 is internally fitted and secured to the housing 1.

In the case of the rotation support apparatus fitted with the rotational speed sensing device of the present invention constructed as described above, when the inner ring 6 rotates together with the rotation shaft 2, there is a change in the output from the sensor 20, the detecting section of which faces the ring portion 16 serving as the detected of the encoder 14 via the small gap.

As described above, since the frequency at which the output of the sensor 20 changes is proportional to the rotational speed of the inner ring 6, if a signal representing the output is sent to a control device, not-shown, via the harness, the rotational speed of the rotation shaft can be obtained.

Particularly in the case of the rotation support apparatus fitted with the rotational speed sensing device, the sensor carrier 19 for supporting the sensor 20 is internally fitted and secured to the inner peripheral face of the step portion 9 formed on the inner peripheral face of the housing 1. In other words, in the case of the present invention, the sensor carrier 19 is not securely supported on the outer ring 4. Therefore, even if creep occurs in the outer ring 4 with long term use of the rolling bearing 3, so that the outer ring 4 rotates inside the housing 1, the sensor carrier 19 for supporting the sensor 20 can be prevented from rotating together with the outer ring 4. Hence, a problem where the sensor 20 rotates or the harness guided out from the sensor 20 is severed can be prevented.

Moreover, in the case of this example, an abutting portion 23 constituting the cover 21 of the sensor carrier 19 is abutted against the stepped face 10 of the step portion 9. Therefore, positioning of the sensor 20 supported on the sensor carrier 19 in the axial direction can be facilitated. Furthermore, since positioning of the sensor 20 in the axial direction can be performed reliably, the rotational speed can be accurately detected.

Moreover, in the case of the present invention, the rolling bearing 3 for supporting the encoder 14 and the sensor carrier 19 for supporting the sensor 20 can be handled separately, hence the fitting operation for these members can be facilitated. For example, if an operation for internally fitting and securing the sensor carrier 19 to the step portion 9, and an operation for connecting the harness to the sensor 20 are carried out before incorporating the rolling bearing 3, and when the work space inside the housing is relatively secured, the fitting operation of the sensor carrier 19 and the harness can be facilitated.

Moreover, subsequently at the time of fitting the rolling bearing 3, the operation for ensuring that the harness is not caught in the respective fitting portions between the outer ring 4 and the inner ring 6 of the rolling bearing 3 and the housing 1 and the rotation shaft 2 can be facilitated.

In the case of this example, the step portion serving as the portion for fitting and supporting the sensor carrier 19 is an existing portion for positioning the outer ring 4 in the axial direction. Hence, an additional portion is not required for fitting and supporting the sensor carrier 19. Therefore, rotation of the sensor 20 can be prevented without an increase in cost.

Figure 2:
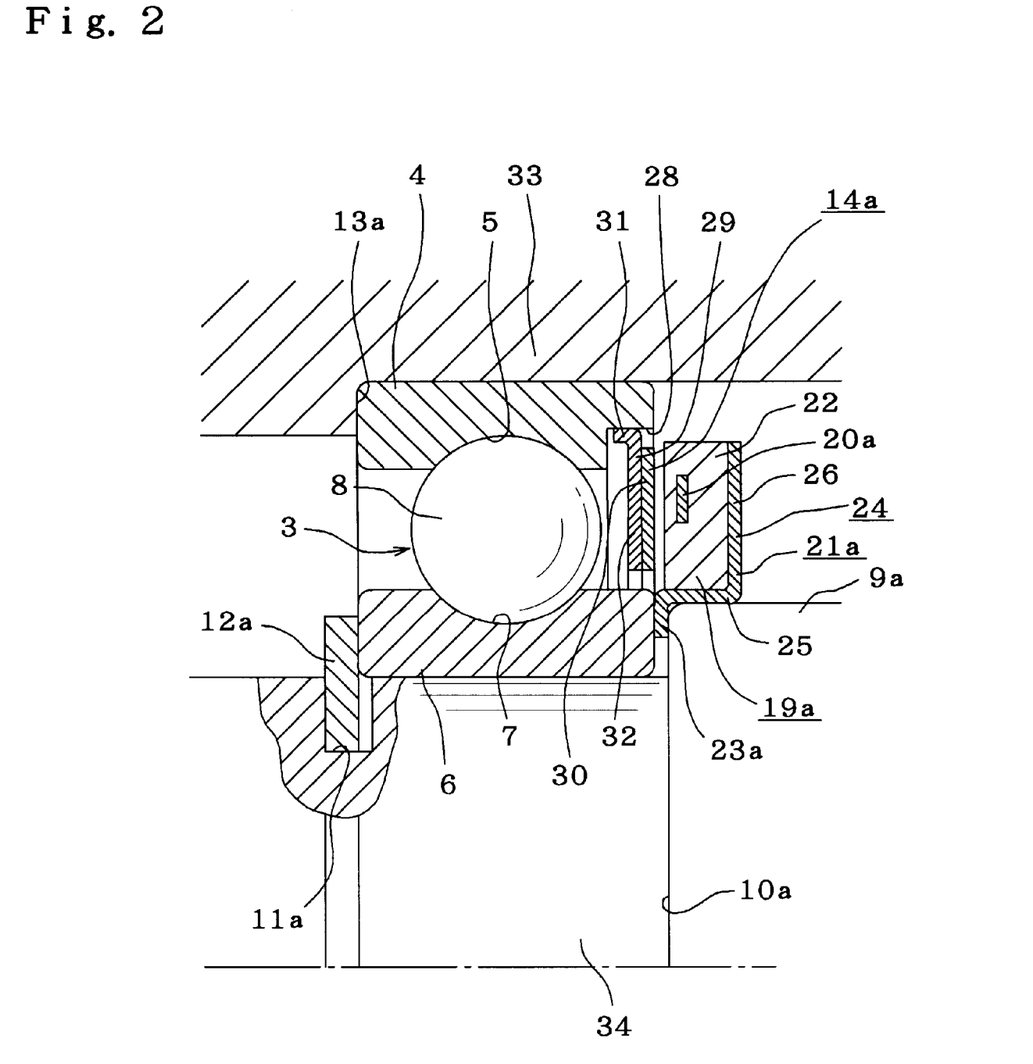
FIG. 2 is a partially broken, cross sectional view of a half portion of a second example of the embodiments of the rotation support apparatus according to the present invention.

FIG. 2 shows a second embodiment of the present invention. In the case of this example, the present invention is applied to a rolling bearing unit where an outer ring 4 serves as a rotating ring, and an inner ring 6 serves as a stationary ring. That is to say, in the case of this example, the outer ring 4 is internally fitted by interference fit to the inner peripheral surface of a rotating body 33 that is a rotating member at the time of use. Moreover, one end face of the outer ring 4 (the left end face in FIG. 2) is abutted against a stepped face 13a formed on the inner peripheral face of the rotating body 33.

Furthermore, the inner ring 6 is externally fitted to a fixed shaft 34 that is a stationary member, and clamped in the axial direction between a stepped face 10a of a step portion 9a formed on the outer peripheral surface of the fixed shaft 34 and a stop ring 12a in the form of a semicircular ring or snap ring engaged in an engagement groove 11a formed on the outer peripheral face of the fixed shaft 34.

As described later, in the case of this example, one end face of the inner ring 6 (the right end face in FIG. 2) is abutted against the stepped face 10a via an abutting portion 23a constituting a cover 21a of a sensor carrier 19a.

Moreover, an encoder 14a constituting a rotational speed sensing device is internally fitted and secured by interference fit to a large-diameter step portion 28 formed on the inner peripheral surface at one end portion of the outer ring 4 (the right end portion in FIG. 2). In the case of this example, the encoder 14a consists of a metal core 29 and an encoder body 30. The metal core 29 is formed in an overall annular shape to give an L-shape in cross-section using a magnetic metal plate such as a low carbon steel plate or the like, and comprises a cylindrical portion 31 which is internally fitted and secured to the large-diameter step portion 28 of the outer ring 4, and a circular ring portion 32 bent in the diametrically inward direction from one end rim in the axial direction (the right end rim in FIG. 2) of the cylindrical portion 31.

The encoder body 30 is bonded on one side face (the right side face in FIG. 2) of the circular ring portion 32. The encoder body 30 is formed in an overall circular ring shape from a permanent magnet such as a rubber magnet or the like incorporated with a ferrite powder, and magnetized in the axial direction (in the lateral direction in FIG. 2). The magnetized direction is changed alternately in the circumferential direction at even intervals. Therefore, on one side face (the right side face in FIG. 2) serving as the detected portion of the encoder body 30, S poles and N poles are arranged alternately at even intervals.

The sensor 20a constituting the rotational speed sensing device together with the encoder 14a is supported by the sensor carrier 19a constructed similarly but in reverse, with the inside out in the diametrical direction, as the sensor carrier 19 (FIG. 1) of the first embodiment.

In the case of this example, a cylindrical portion 25 constituting a cover 21a of the sensor carrier 19a is externally fitted by interference fit to the outer peripheral surface of the step portion 9a, and an abutting portion 23a constituting the inner diameter portion is abutted against the stepped face 10a of the step portion 9a. Here, in the case of this example, the abutting portion 23a is clamped between one end face of the inner ring 6 and the stepped face 10a. That is to say, in the case of this example, a step portion for avoiding direct interference with the abutting portion 23a is not formed on the one end face of the inner ring 6, as in the first embodiment described above. In the case of this example, reduction of cost can be realized by not forming the step portion.

A detecting section of the sensor 20a faces one end face of the encoder body 30, serving as the detected portion of the encoder 14a, via a small gap spanning in the axial direction, in a state with the sensor carrier 19a securely supported on the step portion 9a.

Here, in the case of this example, since the detected portion of the encoder 14a is formed on the one end face of the encoder body 30 which is a multipolar magnet, the sensor 20a comprises an IC incorporating a magnetic detection element with the output also changing depending upon the direction of magnetic flux, such as a Hall element, a magneto-resistive element or the like, and a wave-shaping circuit for shaping the output waveform from the magnetic detection element therein Moreover, in the case of this example, between the stepped face 10a and the stop ring 12a, as described above, there are clamped the inner ring 6 having only minor dimensional errors, and the abutting portion 23a obtained by forming a metal plate plastically and having relatively large dimensional errors. Therefore, there is the possibility that a gap is caused in opposite sides of the inner ring 6 in the axial direction after manufacturing, due to the dimensional error of the abutting portion 23a, and the inner ring 6 may thus chatter in the axial direction.

Therefore, this embodiment is constructed so that, even if the detected portion of the encoder 14a supported on the outer ring 4 of the rolling bearing 3, and the detecting section of the sensor 20a are displaced relative to each other in the axial direction, due to chattering of the inner ring 6, detection of the rotational speed is not affected.

That is to say, in the case of this example, a multipolar magnet is used as the encoder 30, and the sensor 20a comprises a Hall element or a magneto-resistive element having good sensitivity and for which the output also changes depending upon the direction of magnetic flux, so that the rotational speed can be detected even if the distance between the detecting section and the detected portion changes so as to slightly enlarge the width of the small gap. Hence, even if the inner ring 6 chatters, and the width of the small gap slightly changes, the rotational speed can be accurately detected.

In the case of this example constructed as described above, the sensor carrier 19a for supporting the sensor 20a is externally fitted and secured to the step portion 9a formed on the outer peripheral surface of the stationary shaft 34. In this point, the present invention is different from U.S. Pat. No. 5,622,437. Therefore, even if the inner ring 6 rotates relative to the stationary shaft 34 with long term use, the sensor carrier 19a for supporting the sensor 20a can be prevented from being rotated together with the inner ring 6.

Other details of the construction and operation are substantially the same as for the case of the above described first example, and hence similar components are denoted by the same minerals, and repeated description is omitted.

Figure 3:
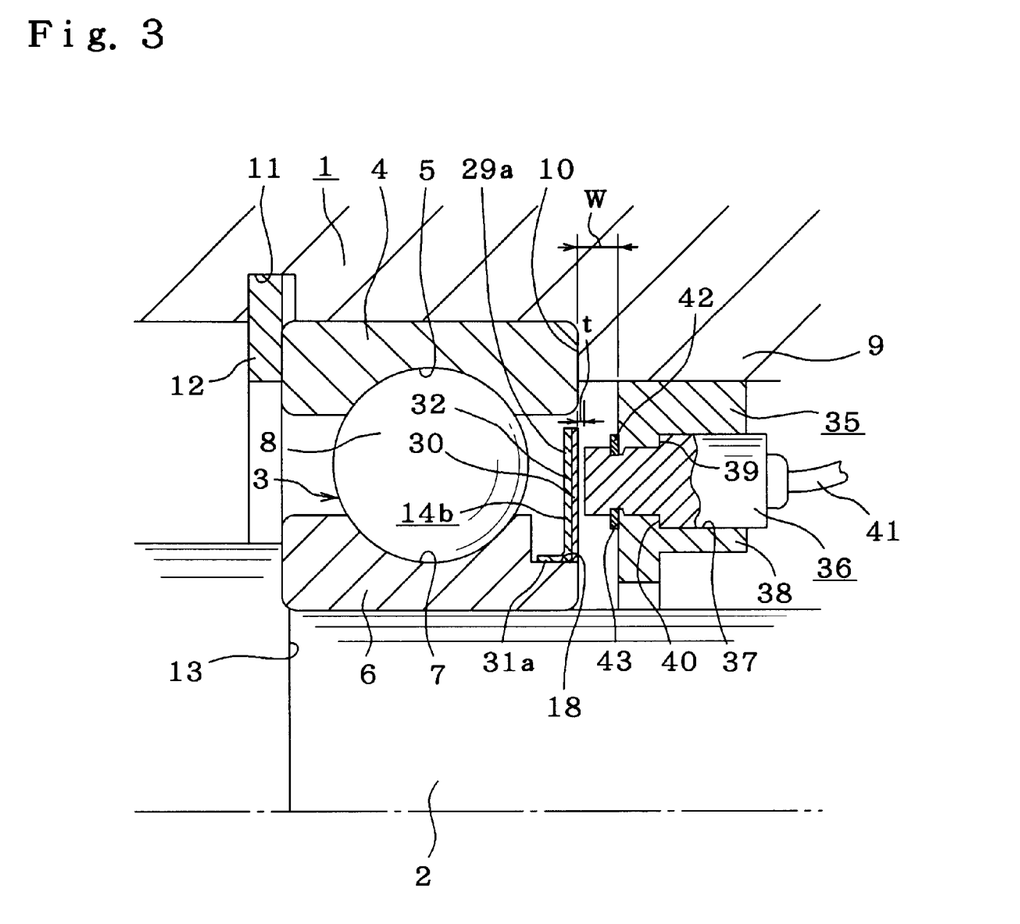
FIG. 3 is a cross sectional view of a half portion of a third example of the embodiments of the rotation support apparatus according to the present invention.
Figure 4:
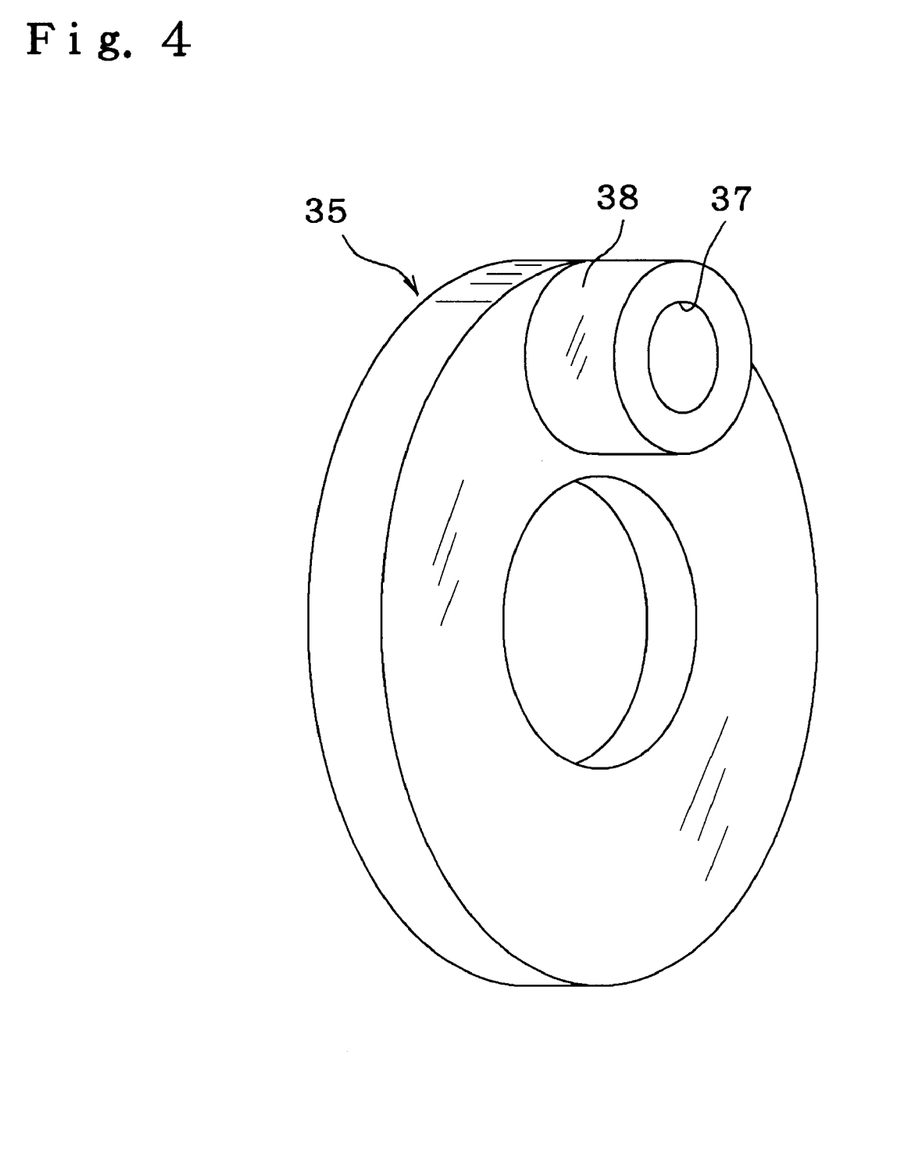
FIG. 4 is a perspective view of a sensor carrier in FIG. 3.

FIG. 3 and FIG. 4 show a third example of an embodiment of the present invention. In the case of this example, a rotation shaft 2 is rotatably supported inside the housing 1 by means of a rolling bearing 3, as in the case of the above described first example. An inner ring 6 that is a rotating ring is constructed in reverse with the inside out in the diametrical direction, to the encoder 14a (see FIG. 2) used in the above described second example.

Moreover, in the case of this example, an encoder 14b is supported on a small-diameter step portion 18 of the inner ring 6. That is to say, a cylindrical portion 31a for externally fitting and securing the encoder 14b to the small-diameter step portion 18 is provided on the inner peripheral rim portion of a metal core 29a of the encoder 14b.

In the case of this example, furthermore, a sensor carrier 35 for supporting a sensor is formed in an overall annular shape, using a synthetic resin material such as PBT (polybutylene terephthalate) incorporated with a glass fiber. In a part of the sensor carrier 35 in the circumferential direction, a support hole 37 for inserting and supporting a sensor unit 36 described below is formed in a state such that opposite side faces of the sensor carrier 35 in the axial direction are communicated with each other.

Moreover, a cylindrical portion 38 is provided in a portion corresponding to the support hole 37, on one side of the sensor carrier 35 (the right side in FIG. 3), and the inner peripheral surface of the cylindrical portion 38 is made to be a part of the support hole 37. A dimension in the axial direction of the support hole 37 (lateral direction in FIG. 3) is increased to ensure the support strength of the sensor unit 36.

In addition, in one side of the support hole 37 in the axial direction (tile right side in FIG. 3), the inner diameter size of the support hole 37 is made larger than a portion on the other side in the axial direction (the left side in FIG. 3). Both end rims of these portions having different inner diameter sizes in the axial direction are made continuous through a stepped face 39. Such a sensor carrier 35 is internally fitted and secured to a step portion 9 provided on the inner peripheral surface of the housing 1.

The sensor unit 36 is formed in an overall stepped cylindrical shape using a synthetic resin, and a sensor comprising a Hall element or a magneto-resistive element and a wave-shaping circuit is encapsulated therein. The outer peripheral surface of such a sensor unit 36 can be installed freely by closely fitting to the inner peripheral surface of the support hole 37.

That is to say, in a portion on a base side (the right side in FIG. 3) of the sensor unit 36, the outer diameter size of the sensor unit 36 is made larger than a portion on a tip side (the left side in FIG. 3), and opposite end rims (in the axial direction) of those portions having different outer diameter sizes are made continuous through a stepped face 40. One end portion of a harness 41 for taking out the output from the sensor is connected to the base face of the sensor unit 36.

In supporting the sensor unit 36 in the sensor carrier 35, the sensor unit 36 is first inserted into the inside of the support hole 37 from one side of the support hole 37 (the right side in FIG. 3), and the stepped face 40 provided on the outer peripheral surface of the sensor unit 36 is then abutted against the stepped face 39 provided on the support hole 37. A recess 42 is formed in the outer peripheral surface of a portion of the tip portions of the sensor unit 36 which protrudes from the other side face of the sensor carrier 35. Then, in this state, a stop ring 43 in the form of a semicircular or snap ring is spanned between the recess 42 and the other side face of the sensor carrier 35.

Though not shown in the drawing, a key is formed spanning in the axial direction in one of the inner peripheral surface of the support hole 37 and the outer peripheral surface of the sensor unit 36, and a keyway is formed spanning in the axial direction in the other peripheral face. These key and keyway are engaged with each other when the sensor unit 36 is inserted into the support hole 37.

Hence, the sensor unit 36 is supported in the support hole 37 in a state which prevents the rotation of the sensor unit 36, as well as preventing the sensor unit 36 from coming out from the support hole 37. Moreover, as shown in FIG. 3, in the completed state with a rotation support apparatus fitted with a rotational speed sensing device, a detecting section of the sensor provided at the tip face of the sensor unit 36 faces a detected portion of the encoder 14b, that is one face of an encoder body 30 (the right face in FIG. 3), via a small gap spanning in the axial direction.

In the case of this example, positioning of the sensor carrier 35 in the axial direction is performed so that in the completed state shown in FIG. 3, the width dimension (t) of the small gap existing between the detecting section of the sensor and the detected portion of the encoder 14b becomes a suitable value.

To enable positioning of the sensor carrier 35 in the axial direction, in the case of this example, when the sensor carrier 35 is internally fitted by interference fit to the step portion 9, the sensor carrier 35 is pressed toward the inner side (the right side in FIG. 3) of the step portion 9 by a press jig, until the space between the other side face of the sensor carrier 35 and the stepped face 10 of the step portion 9 in the axial direction becomes a predetermined dimension (W). This dimension (W) is so regulated that the width dimension (t) of the small gap after completion of fitting becomes a suitable value. In this way, in the case of this example, positioning of the sensor carrier 35 in the axial direction is performed, designating the stepped face 10 of the step portion 9 as the reference face.

In addition, in the case of this example, the operation for internally fitting and securing the sensor carrier 35 to the step portion 9 is carried out before incorporating the rolling bearing 3 and when the work space inside the housing 1 is relatively secured.

Moreover, the operation for attaching the sensor unit 36 to the sensor carrier 35 and fitting the harness 41 between the sensor unit 36 and a control device, not-shown, are carried out before incorporating the rolling bearing 3 in place, to thereby facilitate the fitting operation of these members.

Other details of the construction and operation are substantially the same as for the case of the above described first example.

The rotation support apparatus fitted with a rotational speed sensing device according to the present invention is constructed and operated as described above. Hence, even if creep occurs in the stationary ring with long term use, a construction to prevent the sensor carrier for supporting the sensor from being rotated together with the stationary ring can be realized at a low cost.

What is claimed is:

1. A rotation support apparatus provided between a stationary member with a peripheral surface and a rotatable member, the stationary member having a step portion with a peripheral surface and a radially extending stepped face, and the rotation support apparatus comprising a stationary ring having a first peripheral surface formed with a first raceway, the stationary ring being fitted to and supported by the peripheral surface of the stationary member, a rotating ring having a second peripheral surface opposed to the first peripheral surface and formed with a second raceway, the rotating ring being fitted to and supported by the rotatable member, a plurality of rolling members rotatably provided between the first raceway and the second raceway, an encoder supported by and fixed to part of the rotating ring to be concentric with the rotating ring and having a detected portion, the detected portion having circumferential characteristics alternately changing with a uniform pitch, and a sensor having a detecting portion opposed to the detected portion of the encoder, the stationary ring having one axial end face which is abutted directly or via another member to the stepped face of the step portion of the stationary member, so that the stationary ring is axially positioned, and a sensor carrier provided for holding the sensor and fitted to and fixed by the peripheral surface of the step portion and positioned in place in the axial direction with reference to the stepped face and apart from the stationary ring.

2. The rotation support apparatus of claim 1, wherein a portion of the sensor carrier is abutted to the stepped face to position the sensor carrier in place in the axial direction with reference to the stepped face.

* * * * *